INVENTOR
JOHN F. FLECK
BY D. R. Birkholz
W. A. Schaich
ATTORNEYS

United States Patent Office 3,708,274
Patented Jan. 2, 1973

3,708,274
METHOD OF LIFTING A TV FUNNEL MOLD RING OFF A MOLD, ORIENTING IT INTO POSITION, AND SETTING ON FUNNEL MOLD
John F. Fleck, Columbus, Ohio, assignor to
Owens-Illinois, Inc.
Filed Aug. 18, 1967, Ser. No. 661,665
Int. Cl. C03b *11/00, 9/40, 9/00*
U.S. Cl. 65—307
13 Claims

ABSTRACT OF THE DISCLOSURE

An apparatus for orienting part of a glass forming mold. An apparatus employing a pick-up mechanism that disengages the top ring of a mold and orients it by rotation in a horizontal direction before engaging the ring once again with the main portion of the mold. A method of orienting the top ring section of a glass forming mold by grasping the mold by a flanged portion thereof, lifting the ring so that it is disengaged from the mold, arcuately displacing the ring section until it achieves a predetermined orientation, positioning the oriented ring upon the mold, and releasing the ring so that it may rotate with the mold.

---

This invention relates to a method and apparatus for the manufacture of hollow articles by combined pressing and centrifugal molding action, more particularly the present invention relates to the molding of generally frusto-pyramidal shaped hollow glass articles having large ends of non-circular contour which are molded to finished contour by spinning against a ring portion of the mold.

The invention as set forth in this specification is particularly adapted to the manufacture of hollow glass funnels or body members of cathode-ray picture tube envelopes for television reception and particularly tube envelopes having rectangularly shaped viewing screens.

Both monochromatic and polychromatic television pictures are transmitted having a rectangular pattern with a screen ratio of 4:5 and rectangularly shaped screens are conventional for recreating and displaying such pictures. Previously, the prior art of manufacturing television picture tube envelopes provided circular viewing screens; however, such screens became obsolete because of the fact that peripheral areas of the transmitted pictures were lost and they could not be efficiently recreated on a screen of altogether different geometric outline. As the popularity of larger sizes of viewing screens has increased, there has been a transition from round cathode-ray tubes to rectangular tubes which are now employed almost exclusively in the industry. More recently, the so-called wide-range "square-look" tube envelopes have attained still further popularity in providing both larger and more definitely rectangular contoured viewing screens. Such envelopes possess a reduction in overall tube length because of wide electron-beam deflection angles.

As presently manufactured, a cathode-ray picture tube envelope or bulb is made by separately fabricating a hollow glass funnel which constitutes the tube body portion. These parts are subsequently sealed together at their complemental edges of similar contour as by thermal fusion or by other solder techniques employed especially in polychromatic receiving tubes.

More recently, the hollow frusto-pyramidal funnel portion of the rectangularly contoured cathode-ray tube has been made by centrifugal molding action wherein a charge of molten glass is deposited in the apex area of a hollow upwardly-facing mold and the mold is immediately rotated about its vertical axis to form the hollow body portion of the funnel. The large open end of the funnel has in the past been initially formed to the desired contour with a moil portion attached to the large or open end of the funnel. The moil was subsequently trimmed from the funnel before sealing to the face plate member. After the moil had been trimmed from the large end of the funnel, the remaining glass edge was sharp and somewhat uneven in peripheral contour. The unevenness in edge contour was not a serious problem in monochromatic receiving cathode-ray tubes since they were attached to their respective face plates by actually welding or fusing the glass together by the application of heat. However, in the uniting of funnels to face plates adapted for polychromatic reception, the ragged edge formed by moil separation with the funnel does present a problem since colored television funnels and face plates are united by a cold solder technique that does not melt the edges of the glass. Consequently, after the moil section of a color receiving funnel has been separated therefrom, the uneven edge must be ground so that it falls in a plane normal to the fore and aft axis of the overall picture tube. The grinding operation for funnels is time consuming, expensive and subjects the ware to additional handling which inherently results in some breakage losses.

Normally, in the manufacture of funnel members for cathode-ray tube envelopes having both circular and rectangular large ends, it has been conventional to introduce a charge of molten glass into the upwardly-facing opentopped mold which is then rotated to distribute centrifugally the major portion of the glass charge over the wall of the mold while advancing a cylindrically-shaped tool downwardly into the tubular apex region of the mold to contact and shape the glass therewithin. Such forming of the apex area of the funnel is necessary to achieve formation of the funnel vortex region with desired wall thickness and accurately-contoured outwardly-flaring surfaces in an area of the mold where small moments of inertia are applied to the molten glass charge upon centrifugal casting. An example of the formation of cathoderay tube envelopes and methods of froming the body portion thereof are described and illustrated in U.S. Pat. No. 3,132,018 to Prendergast et al. which issued on May 5, 1964, and is titled Centrifugal Casting Apparatus for Making a Glass Article.

Since the large end of the cathode-ray tube funnel is ideally of planar contour attempts have been made to spin cast the funnel to final configuration, including the large peripheral edge. In order to spin the entire funnel to final configuration at its large end, a two-piece mold is required. The top ring is affixed to the large end of the frusto-pyramidal portion of the mold, the molten charge is dropped therethrough as heretofore described, and the glass progresses up the inside sloping walls of the mold as it is spun very rapidly. As the molten glass reaches the ring, its further advancement up the inclined walls of the funnel mold is halted, thus producing a planar top edge. Subsequent removal of the completed funnel necessitates the removal of the top ring against which the molten glass was spun.

The removal of the top ring was not too much of a problem when television tubes of round configuration were fabricated by the spin against a ring process. The ring could be lifted up for the removal of the completed funnel and set back down upon the mold regardless of its orientation, since both mold and ring were of circular configuration.

As can be seen in the aforementioned Prendergast et al. patent highly automated machinery is utilized in the production of television funnels. The machinery for producing funnels generally employs an arcuate array of molds, each moving past a given work station where specific operations are performed; for example, molten glass can be introduced into one of the funnel molds at one station. The molten glass is then subjected to the action of a pressing plunger so that the control portion of the molten glass is distributed about the apex area of the funnel by the plunger mechanism. Subsequent spinning of the mold forms the completed funnel. The mold may stop at any attitude and the ring is lifted off so that the funnel may be removed. Returning the mold ring to another mold whose orientation differs from the mold from which the ring was removed presented a real problem which the present invention overcomes.

The present invention, however is directed toward overcoming the difficulties inherent in coupling a ring section of a mold with its complemental portion so that they will mate together regardless of the attitude of the ring when it was removed from the mold.

Accordingly, it is the primary object of the present invention to provide an apparatus for forming the body portion component of a television picture tube envelope which has an essentially rectangular configuration at its large end with an edge that is formed to final configuration while in the mold.

Another object of this invention is to provide an apparatus that can remove the rectangular ring section of a two-piece mold and orient it so that it can be reunited with another mold of similar rectangular configuration.

A further object of the present invention is the provision of an apparatus for removing the ring portion of a television funnel producing mold, including apparatus to rotate the ring while separated from the mold and the placing of the ring in an oriented position on another mold of similar configuration.

Yet another, and no less important, object of the present invention is to provide a method of forming a funnel member of a cathode-ray television picture tube which is non-circular and which is finished to final configuration at its large end by spinning against a ring.

A still further object of the present invention is to provide a method of forming a frusto-pyramidal shaped hollow glass member from a molten glass charge by pressing the apex portion into configuration and distributing the remaining flowable portion of the molten glass charge into a rectangularly-disposed pattern for centrifugal casting including the formation of an edge at the large end of said member against a ring that imparts a generally planar contour to said edge.

The specific nature of this invention, as well as other objects and advantages thereof, will become apparent to those skilled in the art from the following detailed description taken in conjunction with the included sheets of the drawings in which are illustrated the preferred embodiments of this invention.

While this invention will be described hereinafter as specifically applicable to forming hollow glass bodies such as funnel members of cathode-ray picture tube envelopes, it will be readily apparent to those skilled in the art that the principles of the invention are equally applicable to forming many other types of hollow articles having modified frusto-conical or frusto-pyramidal configurations.

Figure 1:
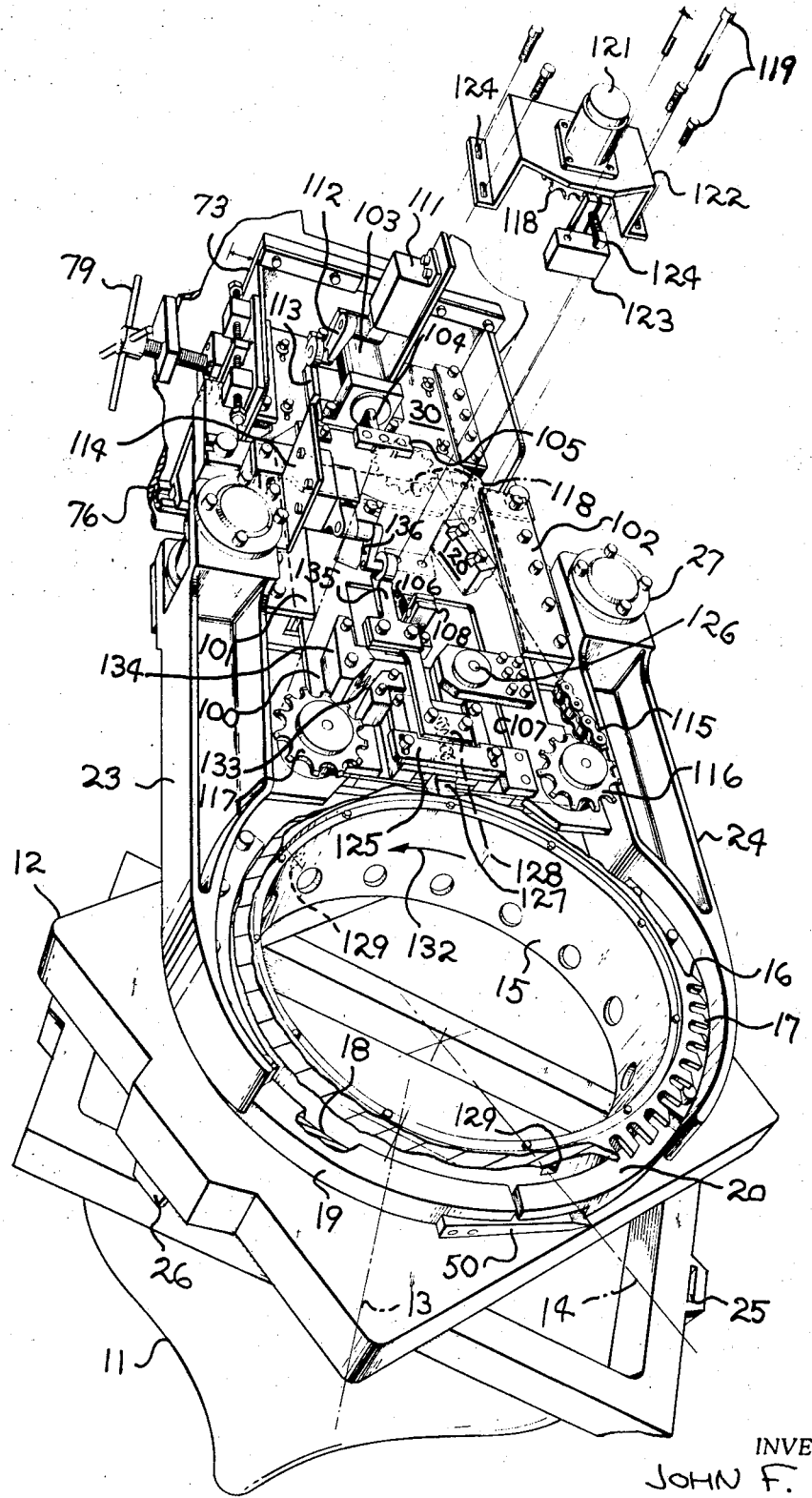
FIG. 1 is a part-sectional perspective view looking down upon the apparatus of the present invention.

Referring now to the drawings and specifically to FIG. 1 there is shown at 10 a perspective view of the overall mold orienting apparatus which comprises the present invention. The frusto-pyramidal shaped funnel mold is shown at 11, however, it is shown for reference only and is not considered an essential part of the invention. Positioned immediately above funnel mold 11 is a mold ring 12 which rests on the top of the funnel mold 11. Ring 12 can be lifted entirely free from funnel mold 11 to facilitate the removal of a glass article that is fabricated therein by the spin cast method. Ring 12 is, of course, necessary for the formation of, for example, a glass television picture tube funnel that has a finished edge at the large end thereof. Ring 12 provides a stop for the molten glass as it climbs up the sloping walls of funnel mold 11 under the influence of centrifugal forces associated with very rapid spinning of the funnel mold 11.

Once the glass article which will be hereinafter referred to by way of example as the glass funnel, has attained its desired geometric configuration ring 12 can be lifted free of funnel mold 11 thus permitting the same ring to be utilized on another funnel mold 11. The removal of ring 12 from the funnel mold 11 must be accomplished very rapidly once the funnel mold has been momentarily stopped for the purpose of ring removal. After the ring has been removed from the funnel mold, the mold is immediately accelerated to a fairly high angular velocity so that the newly formed glass funnel will not flow or bend from its as formed configuration. Subsequent cooling of the glass funnel permits its removal from the mold. After the glass funnel has been removed from the funnel mold 11, the mold is oriented by the apparatus upon which it is spun and translated in an arcuate path. Thus, the orienting of the funnel mold always arranges the mold so that it is in the position represented by axis line 13 of FIG. 1. Also shown in FIG. 1 is axis 14 which represents only one of the infinite positions that ring 12 can assume when it is picked up and disengaged from funnel mold 11. Therefore, it will now become obvious why ring 12 must be oriented before it can be set down upon the next mold. The funnel molds all pass beneath the ring orienting apparatus 10 in precise alignment, since all funnel molds are oriented so that their axes are in alignment with axis 13 as depicted in FIG. 1. The mold ring 12 is picked up at any position; therefore, it must be rotated so that its axis 14 coincides with axis 13 of the funnel mold before it can once again be set down.

It will be appreciated that as the mold with its already formed glass funnel is deaccelerated in order to provide for lifting of the ring 12 therefrom, it may stop at any attitude. To orient the mold and then lift the ring would place a serious time limitation on the apparatus utilized in making glass funnels and also the newly formed glass funnel would be subject to deformation because of its unstable molten condition. By removing ring 12 from the funnel mold as soon as possible, the just formed glass funnel can once again be indexed to another station where centrifugal forces are applied during a gradual cooling cycle.

Referring now to FIG. 1 in more detail, mold ring 12 contains, on the upper section, an annular member 15 which is firmly attached to the lower rectangular section of ring 12. Annular member 15 contains an outwardly extending flange 16 which carries teeth 17 around the entire periphery. In addition to outstanding flange 16, annular member 15 contains a circumferentially extending groove, the top of which can be see at 18. A radially inwardly extending flange attached to arcuate arm 19 mates with groove 18, thus permitting the entire ring 12 to be rotatively supported as desired. Arcuate arm 19 coacts with arcuate arm 20 and both arms 19 and 20 are in turn supported by movable castings 23 and 24.

Briefly, movable castings 23 and 24 operate in the following manner. When ring 12 is to be lifted from its engagement with funnel 11 subsequent to the spin operation, arms 19 and 20 move toward each other, thus fitting into groove 18 in the exterior wall of annular member 15 which is, of course, attached to the top of ring 12. The entire assembly is then raised, thus freeing ring 12 from keyed engagement such as at keyway 25 and key 26. The ring 12 is then free to be oriented as will hereinafter be explained.

Figure 2:
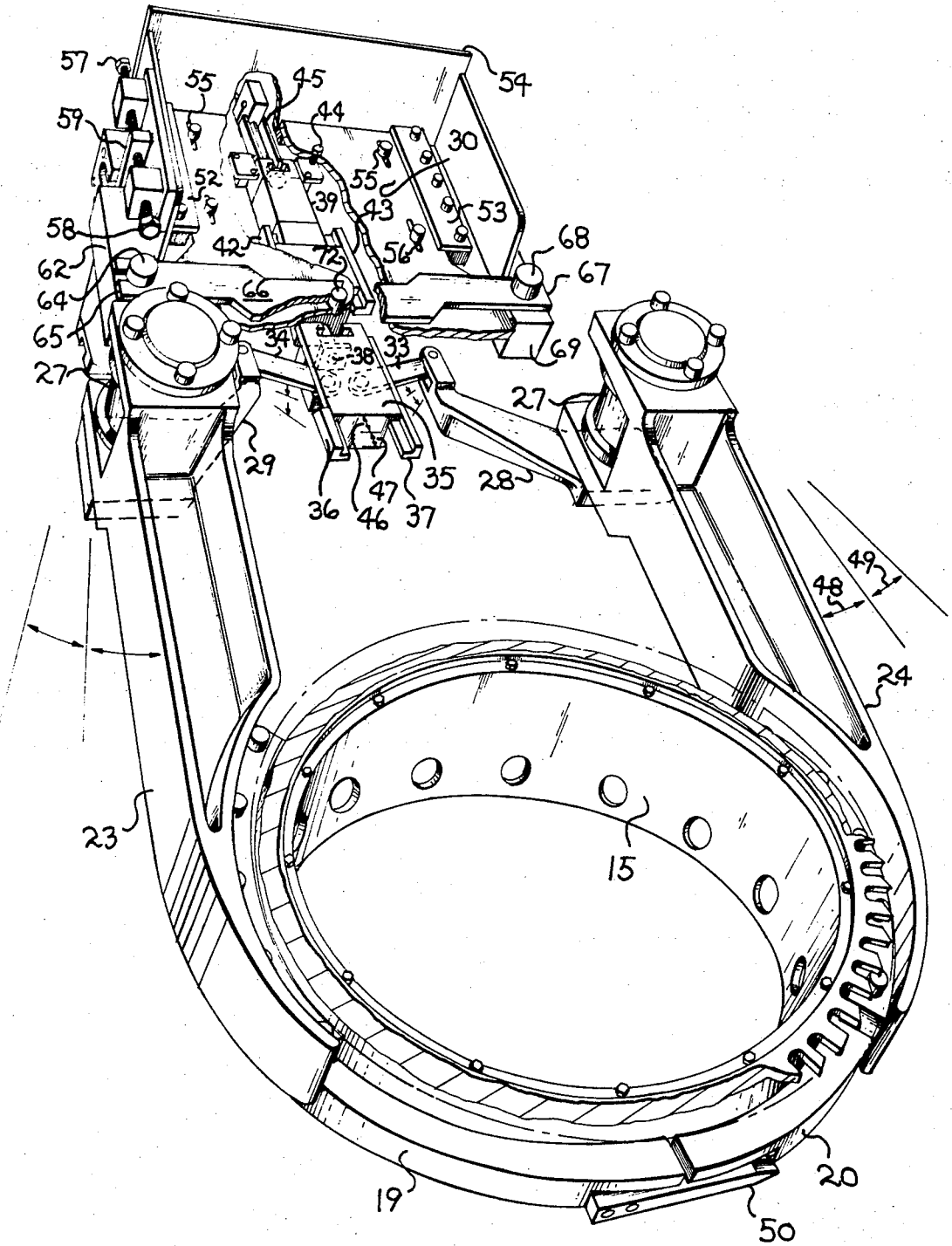
FIG. 2 is a broken away perspective view similar to FIG. 1 that shows more clearly the grasping mechanism that lifts the mold ring.

To complete the description of arms 19, 20 and how they operate reference is now made to FIG. 2. Support castings 23 and 24 are pivotally cantilevered from bearings 27 which are securely mounted to support plate 30. Rigidly attached to movable castings 23 and 24 are arms 28 and 29 that connect through linkage rods 33 and 34 to slide mechanism 35 which in turn moves in fixed tracks 36 and 37.

As slide mechanism 35 moves fore and aft along tracks 36 and 37, the ends of arms 28 and 29 rotate in unison, thus causing arms 19 and 20 to move into and out of engagement with annular member 15. Slide mechanism 35 is attached to the movable end of piston rod 38. Piston rod 38 can retract and extend through the action of actuator 39 which is also fixedly supported in slides 42 and 43. It is apparent that piston 39 can be locked in the desired position along slides 42 and 43 by bolts such as 44. An adjustment mechanism is depicted generally at 45. An adjustment when made through mechanism 45 affects the fore and aft position of piston 38, thus the overall movement of slide mechanism 35 can be controlled. This control feature is important from a standpoint of achieving minute adjustment of arms 19 and 20 with respect to the exterior of annular member 15.

Piston 38 is capable of stopping at two predetermined positions which are shown at 46 and 47. When actuator 39 moves slide mechanism 35 through the distance as indicated by 46, the arms 19 and 20 move radially away from annular member 15, thus freeing it for spinning with funnel 11. When actuator 39 causes slide mechanism 35 to be translated to position 47, arms 19 and 20 open even wider, thus facilitating the entire removal of the ring assembly 12, 15 from the confinement of the ring orienting apparatus. A guide pin and socket arrangement is shown on the extremities and most forward ends of arms 19 and 20. This assembly is represented by numeral 50 and insures positive alignment of arms 19 and 20. The angles shown at 48 and 49 represent the respective positions of castings 23 and 24 which can be achieved through the action of actuator 39.

Arms 19 and 20 can be also adjusted in a fore and aft direction. As previously pointed out, the bearing supports 27 about which castings 23, 24 rotate, are attached to support plate 30. Support plate 30 is adapted for sliding movement along tracks 52 and 53. Tracks 52, 53 are rigidly mounted to frame member 54. Bolts 55 co-act with slotted holes 56 to lock the desired position of support plate 30 with respect to frame member 54. An adjustment of support plate 30 is made by the proper movement of set screws 57, 58 which act in conjunction with vertically aligned bar 59. Bar 59 is attached to slide rod 62 which can move linearly fore and aft along T-bar 63, see FIG. 3. Pin 64 is vertically aligned and is attached to the top of rod 62. The bifurcated end 65 of rod 66 slidably engages with pin 64. The end 67 of rod 66 is pivotally engaged with pin 68 which is anchored in a forwardly extending portion 69 of frame member 54. Toward the center of rod 66 is a pivot pin 72 which co-acts with a fixed anchor point in support plate 30.

In order to adjust arms 19, 20 in a fore and aft direction with respect to ring 12, the proper adjustment is made by turning adjusting screws 57, 58. The movement of bar 59 causes pin 64 to move, hence arm 66 swings about fixed pin 68. The entire support plate 30 is thus moved in the desired direction since support plate 30 is coupled to bar 66 via pivot pin 72.

Figure 3:
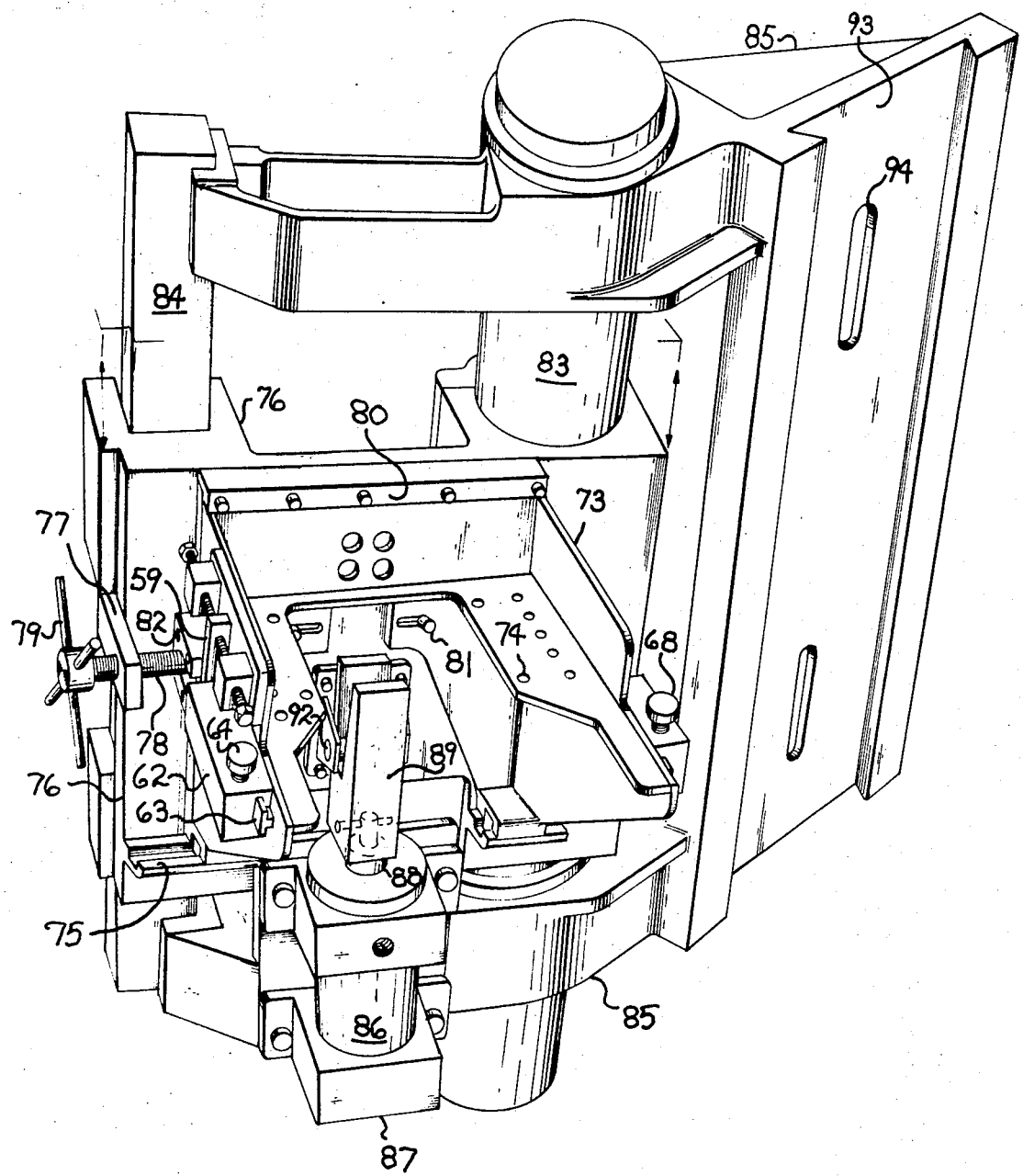
FIG. 3 is a perspective view showing part of the support mechanism associated with the apparatus of FIGS. 1 and 2.

Referring now to FIG. 3 there is shown a support structure for the overall assembly depicted in FIG. 1. The frame member 54 of FIGS. 1 and 2, that is shown at back of the perspective views, fits into the space provided by receiving frame 73. Frame member 54 is held in mating relation with receiving frame 73 by means of bolts 55 (FIG. 2) which fit into threaded holes 74 in frame 73. Frame 73 is mounted for lateral movement on track 75 of support casting 76. The top of frame 73 is also stabilized and slidably supported by retaining bar 80. A cantilevered bar 77 is secured in a rigid fashion from support casting 76. Working in threaded engagement with a threaded aperture through bar 77 is threaded rod 78. The outboard terminal of threaded rod 78 has a readily accessible crank 79. The inboard terminal of threaded rod 78 is rotatively fastened in journal block 82. Lateral adjustment of the entire receiving frame 73, the frame member 54 and the remainder of the horizontally disposed mechanism supported from frame member 54 is achieved through the clockwise or counterclockwise rotation of crank 79. The precise position of this adjustment is maintained by bolts 81.

The entire support casting 76 as shown in FIG. 3 moves up and down along support pillar 83 and post 84 both of which are vertically aligned and are part of base casting 85. The vertical motion of support casting 76 is achieved by actuator 86 which is rigidly supported from bracket 87. Bracket 87 is solidly attached to base casting 85. The piston rod 88 of actuator 86 is attached to a clevis block 89 that contains a rather deep bight for accommodating cantilevered pin 92. As piston rod 88 of actuator 86 is extended in an upward direction, the clevis block 89 will exert an upward force upon pin 92 which is rigidly attached to support casting 76. Thus it is evident from the aforegoing discussion that support casting 76 and the entire apparatus cantilevered therefrom which is depicted in FIGS. 1 and 2 will also move upward under the influence of actuator 86. It is by this action that ring 12 is disengaged from mold 11. By providing for relative motion between clevis block 89 and pin 92, the actuator can be returned to its original or retracted position without support casting 76 necessarily following it during its downward motion. During normal operation the force of gravity will carry support casting 76 downward, however, if because of some malfunction, should ring 12 not be free to travel downward, then serious damage can be avoided since the actuator 86 is free to move downward independently of support casting 76. Additional adjustment of the overall apparatus is attainable through the beveled groove 93 and elongated support holes 94 which are part of casting 85.

Returning now to FIG. 1, another part of the apparatus which actually performs the orienting of ring 12 will now be explained. A plate 100, adapted for fore and aft movement is mounted from and in spaced relationship with support plate 30. Plate 100 is mounted on each side by slide tracks 101 and 102 which are secured to plate 30. At the rear of plate 100 is actuator 103 which is rigidly attached to the top of plate 30 by bolts or other suitable fastening means. The piston rod 104 has its outer end attached to the back edge of horizontally disposed plate 100 by suitable coupling means such as shown at 105. When piston rod 104 is extended and retracted, plate 100 will move in the fore and aft direction. The amount of forward movement of plate 100 is regulated by adjustable stop 106 which is attached to the edge of cutout 107. Cutout 107 is, of course, made in plate 100. Stop 106 when traveling forward along with plate 100 under the influence of actuator 103 abuts against post 108. Post 108 is rigidly mounted from the top surface of support plate 30; this is easily accomplished since support plate 30 is essentially parallel and in spaced relationship with plate 100.

An indicator mechanism is shown at 111 just over actuator 103 in FIG. 1. The indicator mechanism 111 is mounted in fixed relationship with respect to actuator 103 and plate 30. A microswitch and cam follower 112 is shown attached to indicator mechanism 111. A cam rod 113 is supported from the top of plate 100 by a bracket such as 114. By proper camming, a sensing mechanism (not shown) can be alerted should plate 100 not move through its prescribed fore and aft path.

Mounted from a three point suspension from and slightly above plate 100 is chain 115 which is shown in part. Chain 115 passes over two forwardly positioned sprockets 116 and 117. Sprockets 116 and 117 are journaled from axles vertically aligned and cantilevered from the top of plate 100. In a similar manner chain 115 is trained over a single rear sprocket 118. Sprocket 118 is rotatively attached to a motor 121 which is in turn mounted on bracket 122. Bracket 122 is by means of fasteners such as bolts 119 firmly anchored to the top of plate 100. When motor 121 is activated, it will cause chain 115 through sprocket 118 to traverse a path around idler sprockets 116 and 117. An adjustment for maintaining the tension in chain 115 is provided for by block 123 and atttached adjusting mechanism 124. Block 123 is anchored to the top of plate 100 and the adjustability feature is achieved through elongated tie-down holes 124 in bracket 122. Chain 115 is additionally stabilized by blocks such as 120. Motor 121 is preferably a motor that can be stalled out with no damage occurring. By way of illustration motor 121 can be air driven.

Movable chain 115 is at the same elevation and lies in the same plane as toothed flange 16 of annular member 15. Chain 115 is brought into engagement with teeth 17 of flange 16 by the forward movement of plate 100 which is biased or moved under the influence of actuator 103. As chain 115, driven by motor 121 is brought into engagement with annular member 15, said member will commence to rotate. This rotation is utilized in orienting member 15 and ring 12 to the desired attitude.

In order to stop ring 12 at the proper predetermined angle, a stop mechanism has been provided for on the forward edge of plate 100. Reference will now be directed to the engaging mechanism 125 which can be seen in FIG. 1 just to the rear of annular member 15. Engaging mechanism 125 is mounted on the top of plate 100, hence it can be moved toward and away from annular member 15 the same as can chain 115. Engaging mechanism 125 is mounted to and pivoted from fixed support pin 126. Contatined within the box-like structure of engaging mechanism 125 is a latch 127 which protrudes from an opening in the front of engaging mechanism 125. Latch 127 is biased in a forward direction by spring 128. Spring 128 is, in turn, contained within box-like engaging mechanism 125. When plate 100 has been moved to the forward position so as to cause chain 115 to mesh with the teeth 17 of flange 16, latch 127 will contact an annular exterior surface of annular member 15. Latch 127 is adjusted so that it will move in the aft direction against compression spring 128 when it is brought to bear against the exterior surface of annular member 15.

At two diametrically located positions on annular member 15 are latch depressions or notches one of which is indicated at 129. Notches 129 are aligned with axis 14 which is the axis that will align ring 12 with funnel 11. As ring 12 rotates under the driving force of chain 115, latch 127 will slide against the exterior of annular member 15 until latch 127 coincides with one of the notches 129. Latch 127 will engage with notch 129 since it is under constant urging by spring 128. As soon as latch 127 moves into notch 129 the angular motion of ring 12 will be brought to a stop, thus completing the orienting cycle. Since two notches 129 are provided, the angular travel of ring 12 will never have to exceed 180 degrees.

As ring 12 is brought to a sudden stop by the engagement of latch 127 in notch 129, there is a severe impact force that is dissipated by the pivoting support pin arrangement at 126. The entire engaging mechanism 125 will be thrust in a clockwise direction about support pin 126 when latch 127 engages notch 129. Ring 12 is, of course, being driven in the direction shown by arrow 132. The inertia load of ring 12 is absorbed by compression spring 133 which is interdisposed between engaging mechanism 125 and block 134 which is firmly attached to plate 100.

In order to monitor the position of latch 127 an indicator cam 135 extends in the aft direction and coacts with microswitch 136 which is mounted from bracket 114. The indicator system just described can stop the operation of the apparatus if for some reason latch 127 is not functioning in a proper manner or has not indexed in mating relationship with notch 129 of annular member 15.

As has been pointed out supra, the apparatus of the present invention is used in conjunction with a centrifugal casting machine that possesses the capability of producing glass articles such as television tube funnels. The method of forming a glass article by utilizing the present invention will now be set forth in detail.

The centrifugal casting machine indexes from station to station, thus causing funnel molds to be brought one by one beneath the ring 12 of the apparatus as shown in FIG. 1. The funnel mold is already oriented at a predetermined fixed attitude as represented by axis 13. This orienting of the funnel mold is accomplished by the centrifugal casting machine after the preceding glass funnel has been removed from the mold. Once the empty and oriented funnel mold is located immediately below ring 12 and in juxtaposed relationship therewith, ring 12 is set down upon the funnel mold and a gob of molten glass is dropped through the large aperture provided in ring 12 and into funnel mold 11. A vertically aligned plunger which is a part of the previously referred to centrifugal casting machine is pressed against the molten glass which has been deposited in funnel 11. The pressing of the gob of glass forms precisely the interior apex portion of the funnel and also displaces the remainder of the glass toward the exterior of the funnel mold where it can be acted upon more readily by the applied centrifugal forces. The plunger is retracted from the area of the funnel mold 11 and also ring 12. The funnel mold with ring 12 firmly seated thereupon is spun at a fairly high annular velocity, thus causing the molten glass to be evenly distributed over the interior peripheral regions of funnel mold 11 and against the bottom surface of ring 12.

After the spin operation is completed, the funnel mold is brought to a standstill and actuator 39 (FIG. 2) is activated so as to cause arms 19 and 20 to move inward toward each other and grasp ring 12 by indexing in annular groove 18. Following the grasping of ring 12 by arms 19 and 20, the entire assembly including the grasped ring is moved vertically under the influence of actuator 86 (FIG. 3). Actuator 86 moves ring 12 high enough so that the mating keys 26 of ring 12 are completely disengaged from complementary keyway 25 in mold 11. As ring 12 is thus removed in a vertical direction from mold 11, it may be in any attitude since the mold was stopped at no particular position. Once ring 12 is clear of mold 11 plate 100 upon which chain 115 is mounted, is moved forward under the influence of actuator 103. Chain 115, which is normally running under the influence of motor 121, is engaged with teeth 17 which are located on the annular portion 15 of ring 12. Ring 12 is then rotated until latch 127 becomes engaged in one of two notches 129. As soon as latch 127 indexes with notch 129, the rotation of ring 12 is stopped and motor 121 stalls out since chain 115 is also halted by the indexing of latch 127 in notch 129.

While ring 12 is being oriented as described above, a new funnel mold has been placed beneath the apparatus of the present invention. Actuator 86 then retracts its piston rod 88 and the entire assembly including ring 12 is lowered. Ring 12 is then seated upon the funnel therebelow. While actuator 86 is causing the entire assembly to be lowered, actuator 103 is reversed, thus causing plate 100 to be moved in a direction away from ring 12. In moving away from ring 12, plate 100 causes latch 127 to be disengaged with the notch 129 in the exterior of annular member 15. Once ring 12 is firmly in aligned position on top of funnel mold 11, arms 19 and 20 are biased in a radially outward direction with respect to ring 12, thus ring 12 is once again free to operate as a unit with funnel 11 in the formation of a new glass funnel.

The heretofore detailed description of the present invention describes how glass funnels can be made and the encapsulating mold and mold ring separated in a minimum amount of time before detrimental deformation can occur to the newly formed still molten glass article.

The actual electrical, hydraulic, and pneumatic connections along with the timed sequential control of the present invention have been omitted since it is within the purview of one skilled in the art to cause the apparatus of the present invention to perform in the heretofore described manner.

While certain representative embodiments and details have been shown for the purpose of illustrating the invention, it will be apparent to those skilled in this art that various changes and modifications may be made therein without departing from the spirit or scope of the invention.

I claim:

1. In an apparatus for orienting the mold ring of a centrifugal mold for casting a hollow article of generally annular configuration including a pair of grasping arms attached to support means on said apparatus and pivotally cantilevered in spaced apart array so that a mold ring can be disposed therebetween, first means associated with said grasping arms to cause their cantilevered ends to move in unison toward and away from each other to engage and release the mold ring interdisposed between said arms, second means associated with said arm support means to cause said means to move up and down in a substantially vertical direction so that a mold ring can be disengaged from the main section of a mold subsequent to the contacting of said ring by said arms, ring rotating means positioned between said arms and attached to said apparatus so that contact can be made with the periphery of the mold ring, said ring rotating means having a translatory motion tangentially aligned with said ring so as to impart a rotation in said ring, and means associated with said apparatus to stop the rotation of said ring when a predetermined attitude has been achieved.

2. In an apparatus for orienting the mold ring of a centrifugal mold for casting a hollow article of generally frusto-conical configuration, the improvement comprising frame means adapted for mounting to a centrifugal casting machine, a slidably disposed support member attached to said frame means and adapted for vertical translation, a first support plate held in a generally horizontal position and attached to said support member, a pair of cantilevered mold ring contacting arms attached to said support plate and means associated with said arms to cause them to pivot about their cantilevered support ends so that the extremities of said arms can engage a mold ring positioned therebetween, a second support plate movably attached to and arranged generally parallel to said first plate, said second plate adapted to move in a direction generally parallel to said arms, mold ring rotating means attached to said second plate adapted to contact a peripheral region of said mold ring thus inducing rotation, and stop means attached to said second plate for contacting said mold ring and stopping the rotation thereof when a predetermined orientation is achieved.

3. In an apparatus for orienting the mold ring of a centrifugal mold for casting a hollow glass article such as a television tube funnel of generally frusto-pyramidal configuration, the improvement comprising frame means adapted for adjustable mounting to a centrifugal casting machine, a slidably disposed support member attached to said frame means and adapted for up and down translation, means attached to said frame means and said support member to effect at least an upward translation of said support member, a first support plate held in a generally horizontal position and adjustably attached to said support member, a pair of centilevered mold ring contacting arms attached to said first plate remote from the attachment of said first plate to said support member and means mounted on said first plate and attached to said arms to cause them to pivot about their cantilevered ends so that the extremities of said arms will move with respect to each other thus permitting the engagement of said arms with a mold ring positioned between said arms, a second support plate movably attached to and arranged generally parallel to said first plate, means associated between said first and second plates to effect relative motion therebetween, a chain trained over support means anchored to said second plate, motor means adapted to drive said chain so that it can rotate a mold ring, and stop means attached to said second plate for contacting said mold ring and stopping the rotation thereof when a predetermined orientation is achieved.

4. In combination an orienting apparatus and a mold ring which forms the top portion of a mold utilized in the formation of a hollow glass article of generally frusto-pyramidal configuration, said orienting apparatus having frame means adapted for adjustable mounting to a centrifugal casting machine, a slidably disposed support member attached to said frame means and adapted for up and down translation, actuator means attached to said frame means and to said support member to exert an upward force and hence vertical movement to said support member, means associated with said actuator means to permit said support member to travel in the downward direction under the influence of gravity, a first support plate held in a general horizontal position and adjustably attached to said support member, a pair of spaced apart arm supports attached to the extremity of said first plate remote from the attachment of said first plate to said support member and actuator means mounted on said first plate and attached through linkage means to said arms to cause them to pivot about their supports in unison so that the extremities of said arms remote from said linkage means will move with respect to each other thus permitting said arms to engage the exterior of said mold ring, a second support plate movably attached to and arranged generally parallel to said first plate, actuator means associated between said first and second plates to effect relative motion therebetween, an endless chain trained over a plurality of vertically aligned support points anchored to said second plate, motor means mounted from said second plate and adapted to drive said chain so that it can rotate said mold ring, stop means attached to said second plate for contacting said mold ring and stopping the rotation thereof when a predetermined orientation is achieved, and means associated with said mold ring whereby said ring can be rotated by said chain.

5. In combination an orienting apparatus and a mold ring which forms the top portion of a mold utilized in the formation of a hollow glass article such as a television tube funnel of generally frusto-pyramidal configuration, said orienting apparatus having frame means adapted for adjustable mounting to a centrifugal casting machine, a slidably disposed support member attached to said frame means and adapted for vertical translation and lateral adjustment, actuator means attached ot said frame means and to said support member to exert an upward force and hence vertical movement to said support member, a bifurcated member attached to said actuator to permit said support member to travel in the downward direction under the influence of gravity, a first support plate held in a general horizontal cantilevered position and adjustably attached to said support member, a pair of spaced apart arm supports attached to the end of said first plate remote from the attachment of said first plate to said support member and actuator means mounted on said first plate and attached through linkage means to said arms to cause them to rotate about their supports in unison so that the extremities of said arms remote from said linkage means will move with respect to each other thus permitting said arms to engage an exteriorly positioned groove in said mold ring, a second support plate movably attached to and arranged generally parallel to said first plate, actuator means attached between said first and second plates to effect relative motion therebetween, an endless chain trained over a plurality of vertically aligned support points anchored to said second plate, motor means mounted from said second plate and adapted to drive said chain, said chain arranged to move in a tangential direction with respect to said mold ring so that it can be brought into rotating engagement with said mold ring, stop means attached to said second plate for contacting said mold ring and stopping the rotation thereof when a predetermined orientation is achieved, and means associated with said mold ring in the form of an outstanding annular flange having a spaced array of teeth thereon for engagement with said chain.

6. An apparatus as claimed in claim 5 wherein said first plate can be adjusted in a fore and aft direction with respect to its support member by threaded adjustment means anchored to said slidable support member and attached to a movable bar which pivotally engages said first plate thus causing it to be moved with respect to said support member.

7. An apparatus as claimed in claim 5 wherein the slidably disposed support member which is mounted to the frame means can be adjusted laterally by a wheel and threaded rod assembly which co-acts through a threaded aperture on said frame and which is attached to said support member, said support member mounted in slide members on said frame means.

8. An apparatus as claimed in claim 5 wherein said stop means comprises a spring biased latch mounted within a latch support that is pivotally attached to said second plate, said latch support having means for absorbing an inertia load delivered to said latch by the action of said latch on the moving ring mold.

9. An apparatus as claimed in claim 5 wherein said mold ring contains a circular groove positioned in the exterior wall thereof and wherein said mold ring contains a radially outwardly extending flange concentrically positioned with respect to said groove, said flange having a series of circumferentially spaced teeth on the periphery thereof.

10. A method of orienting a mold ring, said method comprising the steps of:
  (1) grasping a mold ring by an annular portion thereof,
  (2) rotating said ring mold until a predetermined orientation has been achieved,
  (3) stopping the rotation of said ring when completely oriented, and
  (4) releasing said mold ring on a mold other than the one upon which the mold ring was originally grasped.

11. A method of orienting a mold ring, said method comprising the steps of:
  (1) grasping a mold ring by an annular portion thereof,
  (2) imparting relative motion between the mold ring and the mold so as to separate one from the other,
  (3) rotating said mold ring until a predetermined orientation has been achieved,
  (4) stopping the rotation of said ring when completely oriented, and
  (5) releasing said mold ring on a mold other than the one upon which the mold ring was originally grasped.

12. A method of orienting a mold ring, said method comprising the steps of:
  (1) grasping a mold ring by an exterior annular portion thereof,
  (2) moving the mold ring away from the mold,
  (3) rotating said mold ring through an angular displacement until a predetermined orientation is achieved,
  (4) stopping the rotation of said ring when completely oriented,
  (5) moving the mold ring toward the position from which it was removed from the mold, and
  (6) releasing said mold ring on a mold other than the mold from which said ring was originally removed.

13. A method of orienting a mold ring, said method comprising the steps of:
  (1) stopping the rotation of the mold to which said mold ring is attached,
  (2) grasping the mold ring by an exterior annular portion thereof,
  (3) lifting the mold ring vertically from the mold until mold and ring are separated,
  (4) removing the mold from beneath the ring and replacing it with another mold,
  (5) rotating said mold ring through an angular displacement until a predetermined orientation is achieved,
  (6) stopping the rotation of said ring when completely oriented,
  (7) lowering the oriented mold ring upon the mold that has been moved into position beneath said ring, and
  (8) releasing said ring so that it may rotate with its mating mold.

References Cited

UNITED STATES PATENTS

| | | | |
|---|---|---|---|
| 877,981 | 2/1908 | Beeson | 65—307 |
| 1,885,409 | 11/1932 | Bragg | 65—323 |
| 2,224,488 | 12/1940 | Rendal | 65—302 X |
| 2,328,662 | 9/1943 | Meredith et al. | 65—307 |
| 3,155,479 | 11/1964 | Zimmerman | 65—302 X |

FRANK W. MIGA, Primary Examiner

U.S. Cl. X.R.

65—323, 357, 361

UNITED STATES PATENT OFFICE
CERTIFICATE OF CORRECTION

Patent No. 3,708,274  Dated January 2, 1973

Inventor(s) John F. Fleck

It is certified that error appears in the above-identified patent and that said Letters Patent are hereby corrected as shown below:

In Claim 1, Column 9, Line 31, insert --first-- before "means."

Signed and sealed this 3rd day of July 1973.

(SEAL)
Attest:

EDWARD M. FLETCHER, JR.  Rene Tegtmeyer
Attesting Officer  Acting Commissioner of Patents